June 2, 1936.  W. HENRY  2,043,171
MOTOR VEHICLE APPLIANCE
Filed June 18, 1932  6 Sheets-Sheet 2

Fig. 2.

Inventor:-
William Henry,
by his Attorneys,
Howson & Howson

June 2, 1936.  W. HENRY  2,043,171
MOTOR VEHICLE APPLIANCE
Filed June 18, 1932   6 Sheets-Sheet 3

Inventor:-
William Henry,
by his Attorneys,
Howson & Howson

Patented June 2, 1936

2,043,171

UNITED STATES PATENT OFFICE 2,043,171

MOTOR VEHICLE APPLIANCE

William Henry, Philadelphia, Pa.

Application June 18, 1932, Serial No. 618,053

12 Claims. (Cl. 123—119)

This invention relates to motor vehicle appliances and more particularly to air or vapor admission devices which are adapted to admit air or vapor to the intake manifold of an internal combustion engine.

An object of the invention is to provide a device which will effect a material saving in the fuel consumption of an internal combustion engine.

Another object of the invention is to provide a device having air or vapor admission means normally controlled by the throttle-actuating mechanism of the engine and which device is manually operable independently of the throttle-actuating means to close the throttle completely and simultaneously admit air or vapor to the cylinders of the engine, whereby the vacuum in the cylinders is destroyed, the suction of lubricating oil from the crank case past the pistons is minimized, and the air or vapor admitted to the cylinders serves as a resisting medium to brake the speed of the engine. The suction of lubricating oil past the pistons is intensified when the throttle is in idling position or if it is completely closed. This can be minimized or prevented by the use of this device, however. If the air or vapor is taken from the upper part of the crank case, as is quite desirable, the admitted vapor carries fine particles of lubricating oil which serve the additional function of lubricating the cylinders from above the pistons.

A further object of the invention is to provide a device of the class above specified which is manually operable at will to render the air or vapor admission means normally under control of the throttle-actuating mechanism completely inoperative.

Other objects will more clearly appear hereinafter. The invention, as exemplified in several different embodiments thereof, may be understood from the following detailed description when read in connection with the accompanying drawings. In the drawings:

Figure 1:
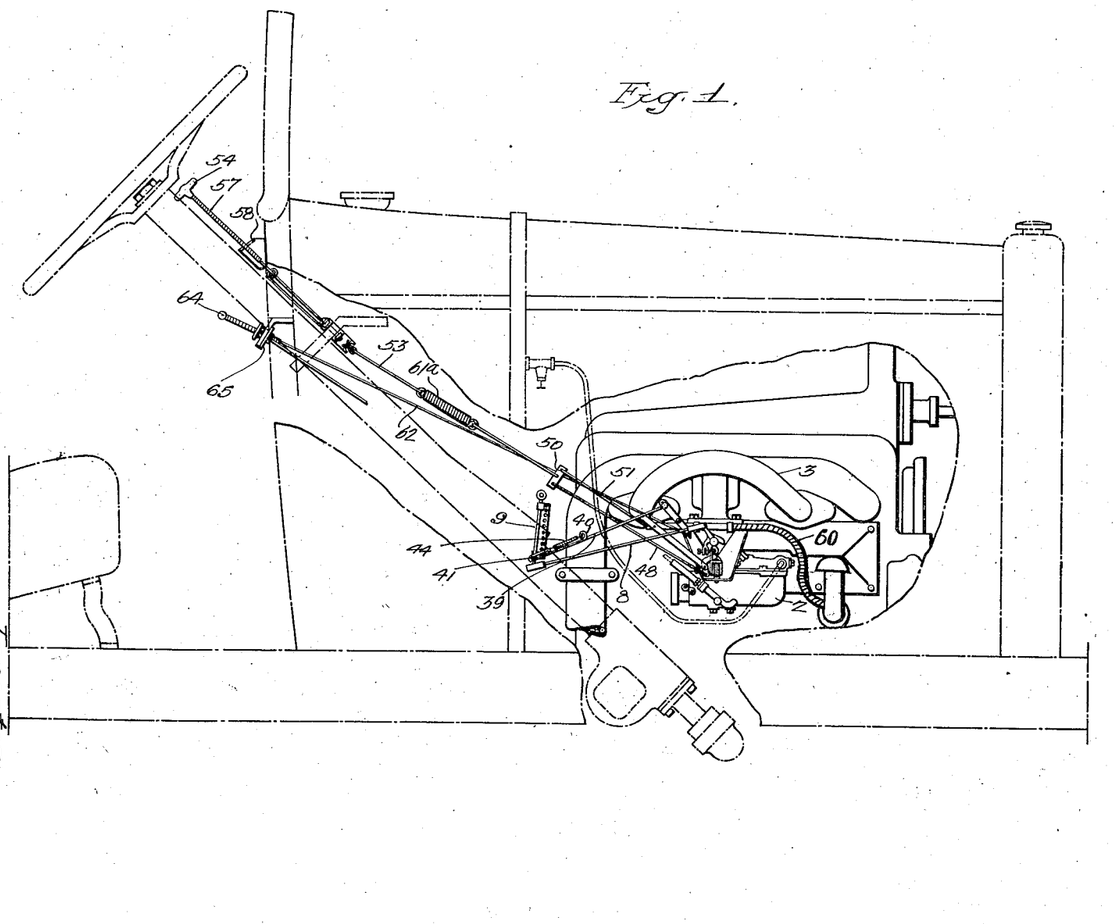
Fig. 1 is a side elevational view of the preferred form of the device installed upon a motor vehicle.

Referring now to Figs. 1 to 8 of the drawings, there is shown in Fig. 1 a motor vehicle 1 having the usual parts of such a vehicle including the carburettor 2 having a throttle 4, intake manifold 3, and the throttle-actuating mechanism which comprises specifically a pivoted arm 6 (see Figs. 3 and 4) which carries the usual idling adjustment screw 7, rod 8, and arm 9 all pivotally connected as illustrated. Arm 9 is adapted for actuation by foot or hand-controlled elements, as will be clearly understood. While the device of the invention is adapted for association with many types of vehicle, it is illustrated and described herein in its application to a particular type of vehicle.

Referring now particularly to Figs. 4 to 8, the preferred form of the device of the invention comprises a valve block 10 which is adapted to be interposed between the manifold 3 and the throttle 4. The block is formed to provide a central chamber 11 to which the ports of the valve lead (see Fig. 7). One side of the block is formed to provide a port 12, while the other side has a plurality of ports 13, in the present instance three, leading to the central chamber. A pair of flat valve members 14 and 15 are slidably mounted on the opposing sides of block 10 by means of suitable guide clips 16. Valve member 14 has an opening 17 therein which is peculiarly formed (see Fig. 4) for a purpose which will appear hereinafter and which is adapted to cooperate with port 12 to uncover the same. Valve member 15 is provided with a plurality of openings 18, which are adapted to cooperate with ports 13 to uncover the same, the number of openings 18 being the same as the number of ports 13 and spaced similarly.

A bracket 19 has an upper transversely bent portion 19' which is formed generally similar to the attachment flanges of the carburettor and intake manifold. Portion 19' is disposed between block 10 and the carburettor flange, and is attached by means of the usual bolts used to fasten the carburettor to the manifold. Bracket 19 pivotally carries an L-shaped lever 20, the lever being pivotally connected at 21 to the bracket. The bracket has a transversely-extending skirt or flange 22. A slidable wedge member 23 having transversely-extending walls 24 and 25 is resiliently mounted upon a heavy coil spring 26 which is interposed between wall 25 of the wedge member and flange 22 of bracket 19. A pin 27 extends freely through wall 25, spring 26, and flange 22 of the bracket. Wall 24 is slotted to receive the extending nose 28 of lever 20. Nose 28 engages the head of pin 27 to move the wedge member against the action of spring 26. Normally, the spring urges the wedge member upward so that the tapered end of wall 24 is interposed between the usual throttle stop 29 and the idling adjustment screw 7. Screw 7 is adjusted with the wedge in its operative position to obtain the desired predetermined slight opening of the throttle, giving idling operation of the engine.

An arm 30 is pivotally connected at 31 to lever 20 and the other end of the arm is slotted at 32 and is slidably connected to the valve member 14 by a bolt extending through slot 32 and one of a series of holes 32a in the end of member 14. This provides for adjustable connection of arm 30 to member 14, which feature will be described in detail hereinafter. A second arm 33 is pivotally attached at 34 to a raised portion 35 of block 10. Arm 33 is slotted at 36 and a pin 37 carried by valve member 14 extends through slot 36 and is adapted to ride therein. The upper end of arm 33 rotatably carries a cylindical block 38, to which one end of rod 39 is connected. Block 38 is provided with a transverse aperture into which the end of rod 39 may be inserted and adjustably fastened by means of a set screw 38a or the like. This provides for adjustable connection of rod 39 to arm 33, which feature will be discussed in detail hereinafter. Rod 39 has a looped portion 40 intermediate its ends (see Figs. 1 and 3) and its other end is formed to provide a slot 41, in which a pin 42 carried by plate 43 extends. This plate may be secured to rod 9 of the throttle-actuated mechanism by means of clips, as shown, and is provided with a series of holes so that rod 39 may have its slotted end attached thereto at any one of a plurality of positions. A spring 44 is connected between the loop portion 40 of rod 39 and plate 43, so as to normally urge rod 39 toward plate 43 to take up the lost motion between these elements.

Figure 4:
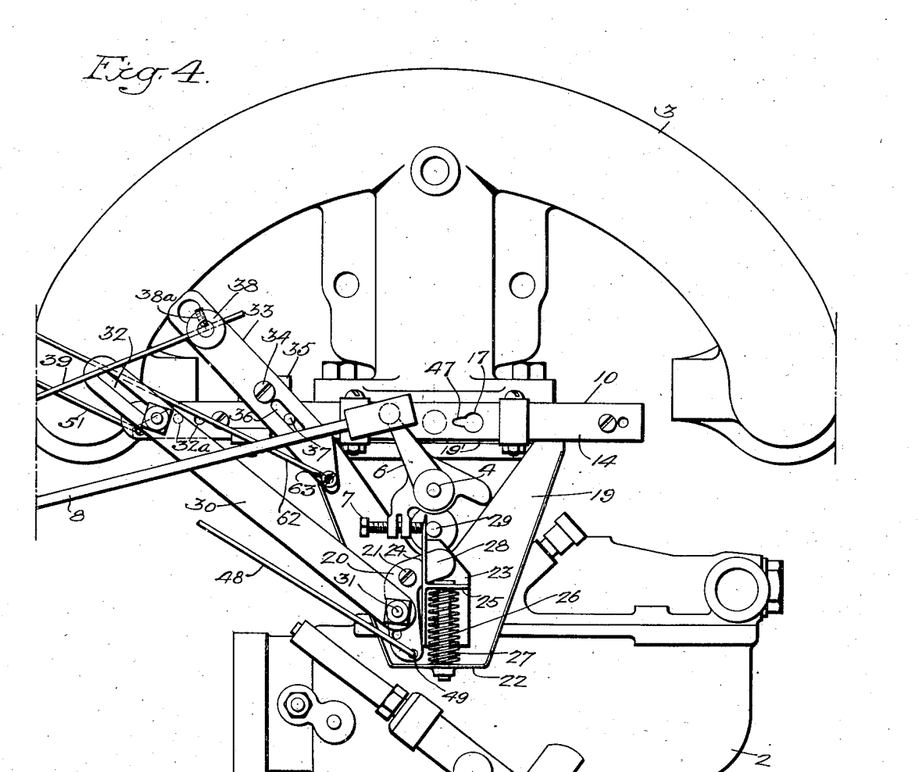
Fig. 4 is a side elevational view of the device per se.
Figure 5:
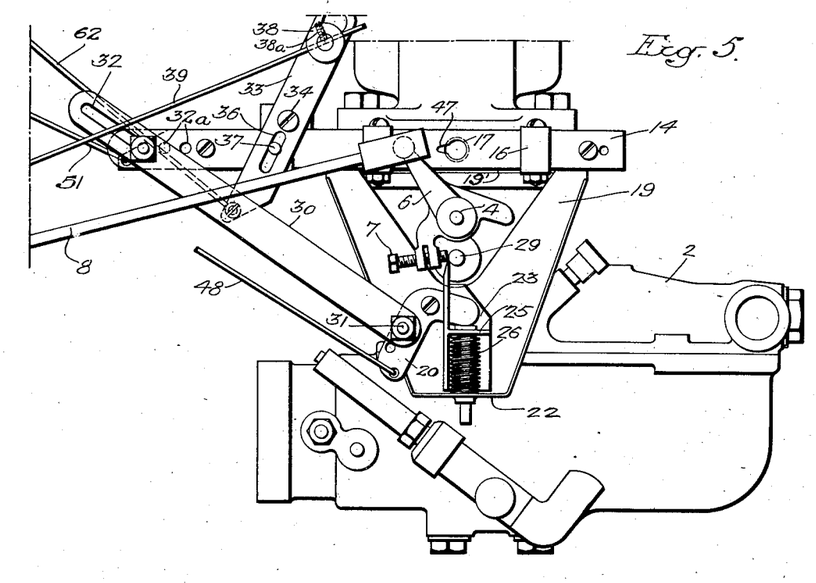
Fig. 5 is a similar view, showing the parts of the device in a different condition.

By virtue of the arrangement just described, it will be apparent that arm 33 is normally under control of the throttle-actuating mechanism through the medium of rod 39. Any movement of the throttle-actuating mechanism will cause arm 33 to rock about its pivot. By virtue of slot 36 and its associated pin 37, the rocking movement of arm 33 will slidably actuate valve member 14. In Fig. 4, the device is shown with the throttle in its idling position and the valve port 12 closed. As the throttle is actuated, the movement of valve member 14 will, of course, effect uncovering of port 12.

It is to be noted that the valve members 14 and 15 are independently operable and that they are normally maintained in their inoperative positions by means of springs 45 (see Fig. 7), which are connected between the ends of the valve members and plate 46 rigidly connected to block 10. The actuation of the valve member 14 by the throttle-actuating mechanism is, therefore, in opposition to the action of its spring 45. At this time, the valve member 15 remains in its inoperative position. The reason for having the valve opening 17 in member 14 shaped as clearly illustrated in Fig. 4 will now be apparent. By virtue of the peculiar shape of this opening, the desired valve opening for different positions of the throttle is obtained. As the opening of the throttle is increased, a greater opening of the valve is had by reason of the registry of a greater portion of the slotted portion 47 of opening 17 with port 12. When the throttle has reached its maximum opened position, the circular body portion of opening 17 will have substantially registered with port 12 to admit a maximum quantity of air. This operation is dependent on the manner of connection of rod 39 to plate 43. While the connection would usually be made so as to give the stated operation, it may be varied to give different actuation of the valve. For example, the connection may be such as to give less than maximum valve opening for maximum opened throttle. Again it may be such as to give full valve opening for partial open throttle and complete valve closure for wide open throttle. Thus the proper and most economical mixture of fuel with air at varying engine speeds may be obtained.

A rod 48 is connected at one end to the lower end of lever 20, as at 49 (see Fig. 4), and at its other end to an equalizing bar 50 (see Fig. 1). A second rod 51 is connected at one end to an end of valve member 15, as at 52, and at its other end to the equalizing bar (see Figs. 1 and 7). The equalizing bar also has connected thereto a pull-wire 53 which passes through the dash of the vehicle and terminates in a manually operable handle 54 located adjacent the steering wheel. In order to maintain the upper free end of the pull-wire substantially stationary so that it may be readily grasped by the operator of the vehicle, a bracket 55 is mounted on the steering column of the vehicle and carries a resilient guide and supporting member 56 through which the pull-wire passes. The upper portion of the pull-wire is formed so as to have an enlarged portion 57. A catch 58 having a slot 59 therein is mounted immediately adjacent the pull-wire. Slot 59 is of such size and shape as to nicely receive the diminished portion of the pull-wire so that this portion may be readily inserted in the slot by the operator. The enlarged portion 57 of the pull-wire, however, is not receivable by, and will not pass through, slot 59. The catch is so positioned that the diminished portion of the pull-wire can be inserted in the slot thereof only after the operator has pulled the pull-wire sufficiently to move the equalizing bar 50 a desired amount. When thus inserted in the catch, the pull-wire is retained and may be released at will by the operator. The chief purpose of this structure is to enable the operator to actuate valve members 14 and 15 simultaneously and also remove wedge member 23 so as to substantially completely close the throttle. The movement of rod 48 causes lever 20 to rock about its pivot and move the wedge member downward against the action of spring 26, as previously set forth. During such movement of lever 20, arm 30, which is actuable by the lever, functions to move the valve member 14. At the same time rod 51 moves valve member 15, the total pulling force on the pull-wire being distributed and equalized by bar 50. When both valve members are thus actuated, ports 12 and 13 will be opened to admit a maximum quantity of air or vapor to the intake manifold. It will be noted that movement of valve member 14 will cause movement of arm 33 but this will not affect the throttle-actuating mechanism because of the lost-motion connection between rods 39 and 43. As shown clearly in Fig. 7, the air admitted through ports 13 passes through a flexible tube 60 and header 61. Tube 60 may be connected to any suitable source of air or vapor and is preferably connected to the upper part of the crank case or the breather tube, as shown in Fig. 1. It will be understood that a like arrangement may be used to admit vapor through valve member 14, if desired.

In order to enable the vehicle operator to keep handle 54 in his hand while still keeping hold of the steering wheel, a spring 61a is preferably interposed between sections of pull-wire 53. This spring allows movement of the upper part only of the pull-wire with normal movement of the operator's hand during driving. The resilient nature of member 56 also aids in this function since it may flex or bend to permit lateral movement of the upper part of the pull-wire. Spring 61a has a predetermined degree of resiliency so that it forms a substantially rigid connection between the pull-wire sections when subjected to sufficient pulling force.

The structure just described constitutes a very important feature of the invention, since it enables the operator to manually and at will close the throttle from its idling position to a completely closed position and admit a predetermined maximum quantity of air to the cylinders above the pistons. The most desirable characteristic of this feature is that it enables a material saving of fuel. For example, let it be supposed that the vehicle is descending a grade. By actuating the pull-wire 53 and catching it in its actuated position, the driver cuts off the fuel supply entirely and admits air or vapor to the cylinders. The engine is, of course, shut off due to the lack of fuel supply but the ignition system continues to operate due to the engagement of the vehicle clutch and gears and the movement of the vehicle. Due to the admission of air to the upper part of the cylinders, the vacuum which would otherwise exist there is destroyed, thereby preventing the suction of lubricating oil from the crank case past the pistons. At the same time, the air or vapor which fills the upper part of the cylinders serves as a resisting medium to brake the speed of the engine and minimizes vibration. When a vehicle is coasting at fairly high speed the engine is idling and is being driven by the vehicle. The small amount of power being developed by the engine is not sufficient to counterbalance the movement of the reciprocating parts and excessive vibration is had, especially on descent of grades. By admitting air or vapor to the cylinder, a counter balancing action is obtained which minimizes the excessive vibration. This action of the device might be compared to so-called "free wheeling", but in this case the additional advantages of fuel saving and constant engagement of the vehicle gears and clutch are had. If the air is taken from the crank case, as above mentioned, and a large portion of it will be so taken in the disclosed embodiment, the fine particles of lubricating oil contained in the vapor are admitted to the upper parts of the cylinders which will serve to lubricate the side walls thereof.

When the vehicle has reached the bottom of the grade and the operator wishes to continue normal operation, he merely removes the pull-wire 53 from its latch, allowing the valve members to move to their normal positions and also allowing wedge member 23 to move to its operative position under the influence of spring 26. At this time, the throttle is opened to its idling position and the engine again starts to operate with the renewal of fuel supply. Since the device prevents oil from being drawn up past the pistons into the top portions of the cylinders, the engine will resume its operation smoothly and will not be required to burn oil which has accumulated in the cylinders above the pistons. In some vehicles, it has heretofore been the practice to provide means for shutting off the engine during descent of grades, but no practical provision has been made to prevent the accumulation of oil in the upper parts of the cylinders and, as a result, the engine resumes operation with a series of explosions and a burning of the accumulated oil. Furthermore, in such devices, the ignition is usually shut off and the fuel supply is maintained at all times, and a quantity of liquid fuel accumulates in the upper parts of the cylinders which is also burned with an explosion. Part of the accumulated liquid fuel also seeps down past the pistons and washes the lubricating oil from the cylinder walls, thereby removing the protection from these surfaces and causing excess wear. Seepage of this liquid fuel into the crank case also tends to dilute the oil and render it less efficient as a lubricant. The present device eliminates entirely the objectionable characteristics of prior devices and methods and also has other desired characteristics of operation as will be apparent from the above description. Instead of latching pull-wire 53, as described above, the operator may manually operate it to operate the device as road and driving conditions warrant, latching pull-wire 53 only if the coasting distance is long. Where conditions are such that the speed of the vehicle is moderate, the operator may pull lightly on pull-wire 53 and owing to the equalizing bar, valve member 15 will operate, but since spring 26 is heavier than springs 45, closure of the throttle will not be effected.

While the feature of the present device in question has been specifically described with reference to the descent of a grade, it may be utilized in any other instance to effect a saving in fuel and efficient operation of the engine. For example, it is very useful in driving in traffic and crossing street intersections. The device being at all times under the control of the operator, he may utilize this function thereof whenever he pleases.

Figure 2:
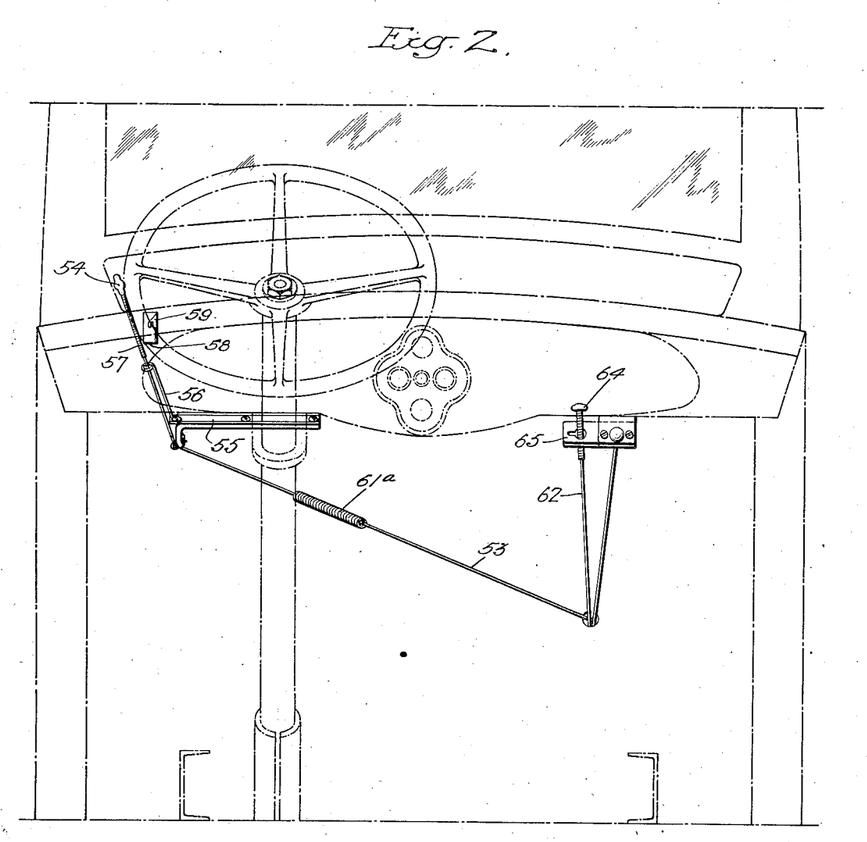
Fig. 2 is an elevational view illustrating the manual control elements of the device associated with the vehicle operator's position.
Figure 3:
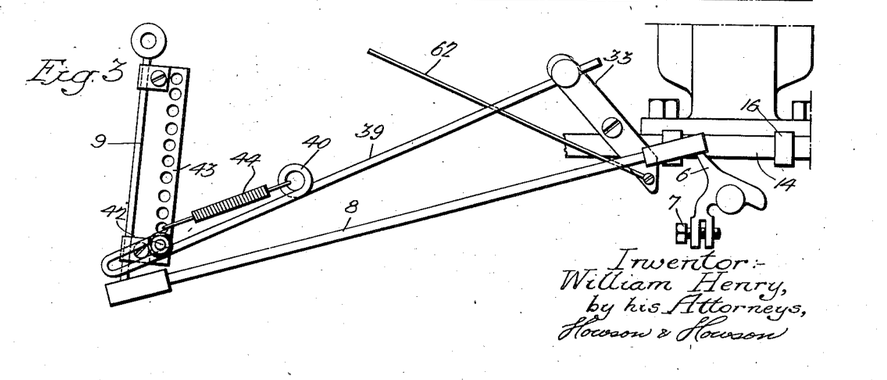
Fig. 3 is an enlarged detail view of the device shown in Fig. 1.

Resuming the description of the structure of the device, a second pull-wire 62 is connected at one end, as at 63, to the lower end of arm 33. This pull-wire also passes through the dash of the vehicle and terminates at a point within easy reach of the operator. The upper free end of this pull-wire is also provided with a handle portion 64 which may be grasped by the operator. The purpose of this construction is to enable the operator to manually render the valve member 14, which is normally under control of the throttle-actuating mechanism, inoperative. It will be apparent that actuation of pull-wire 62 will cause arm 33 to rock about its pivot and move valve member 14. At the same time, this operation is had independently of the throttle-actuating mechanism by virtue of the lost-motion connection of arm 39 and spring 44. Furthermore, this operation is also independent of wedge 23 and its associated mechanism, so that the throttle is maintained in its idling position. This results from the fact that arm 30 is pivotally connected to lever 20 and is slidably connected to valve member 14 by the provision of slot 32. When valve member 14 moves by actuation of pull-wire 62, the connecting bolt extending through slot 32 rides in the slot, this being permitted by the pivotal connection of arm 30 to lever 20. Thus, actuation of pull-wire 62 causes no pull on arm 39 and therefore no actuation of lever 20 and wedge 23. Sufficient actuation of pull-wire 62 causes opening 17 to move entirely past port 12. The essential purpose of this feature is to enable the operator to maintain port 12 closed and to render valve member 14 inoperative. For this reason, a latch 65 is provided to enable the operator to latch the pull-wire in its actuated position in substantially the same manner as above described with reference to pull-wire 53. Preferably the latch is mounted on the guide plate which is normally provided for the choke rod, as shown in Fig. 2. When the pull-wire is latched, opening 17 has moved past port 12, opening the valve momentarily and again closing it. The valve member 14 is rendered inoperative so that the vehicle operates without any auxiliary admission of air. This feature is especially adapted for starting and running during cold weather when it is not desired to admit air to the intake manifold. If desired, the operator may merely make use of this feature during starting by holding a pull-wire 62 manually until the engine has started or he may run continuously for a desired period of time with the pull-wire in its latched position so as to completely shut off the supply of air or vapor through valve member 14. When pull-wire 62 is unlatched, it will of course move back and forth as the throttle-actuating mechanism moves arm 33.

Figure 6:
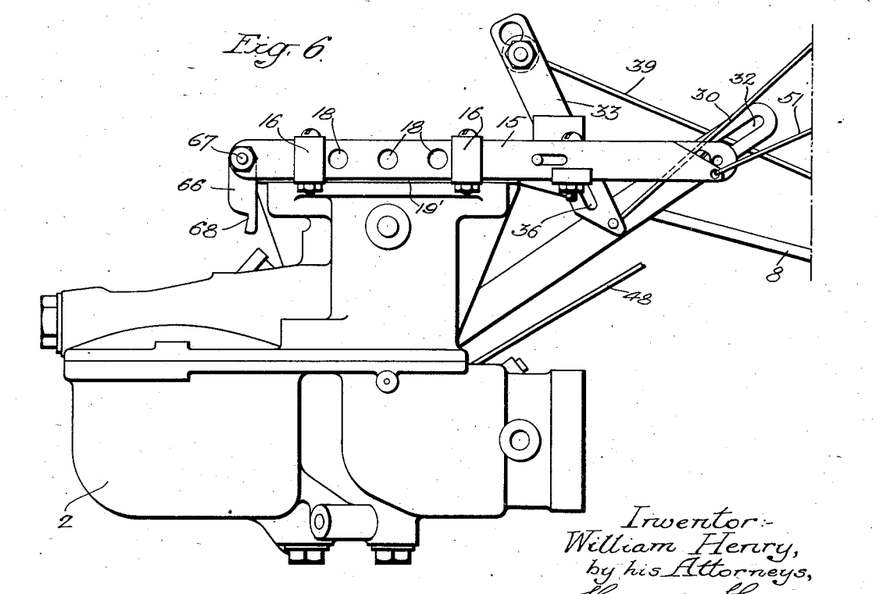
Fig. 6 is an elevational view of the opposite side of the device.
Figure 7:
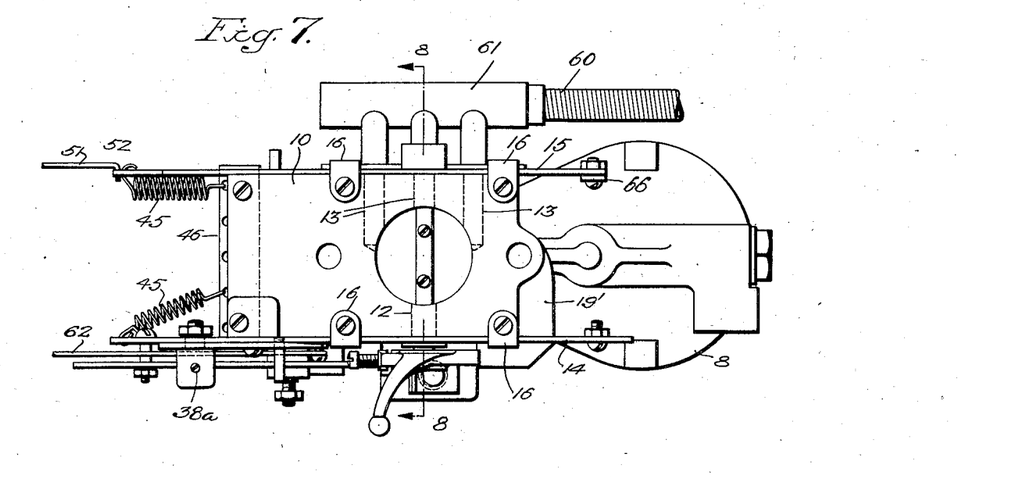
Fig. 7 is a plan view of the device.

In order to enable the operator to render valve member 15 inoperative and to maintain said member in its inoperative position, there is provided a manually operable stop 66 (see Fig. 6) which takes the form of a short arm pivotally attached to the free end of valve member 15, as at 67, and having its free end formed as at 68. In Fig. 6, this member is shown in its inoperative position and when so disposed has no effect upon valve member 15, allowing it to move freely under the influence of pull-wire 53, as above described. In the event that the operator does not desire to open ports 13, however, wishing merely to admit a small quantity of air through valve member 14 when the throttle is in completely closed position as above described, he may move stop member 66 about its pivot until it is substantially parallel with and adjacent to valve member 15. The end portion 68 engages the upper surface of block 10 to maintain the stop member in its operative position. At such time, the shoulder of the stop member will abut against the end of block 10 to prevent movement of valve member 15. Actuation of pull-wire 53 will cause operation of the various elements connected to rod 48, but rod 51 will be ineffective to move valve member 15. This operation is made possible by the equalizing bar 50.

The above described operations of the device assume a certain condition of the various adjustable elements. The device is operable, however, in different manners depending upon the adjustments in any particular instance. By adjusting rod 39 relative to arm 33, the valve action of member 14 as controlled by the throttle-actuating mechanism may be varied to admit air or vapor early or late, as desired. The operator may try various adjustments to obtain the most efficient one for the particular engine and may vary the adjustment to suit climatic and seasonal conditions. This adjustment may also be made with reference to idling speed of the engine, member 14 being set to any desired position for idling position of the throttle.

The operation of the device may also be varied by adjusting the connection of arm 30 to member 14, holes 32a being provided for this purpose, as previously stated. If desired, pull-wire 53 may be maintained normally in latched condition so as to substantially close the throttle, and the adjustment in question may be made so as to open the valve at opening 17 a predetermined amount to admit a continuous predetermined amount of air or vapor. Valve member 15 would under such conditions usually be rendered inoperative by stop 66. Member 14 will be under control of the throttle-actuating mechanism, but will be limited as to its closing position. The predetermined valve opening will be determined by the "slow down" speed at which the operator wishes to drive before it becomes necessary to release pull-wire 53. The slower the "slow down" speed the smaller the valve opening will be. When the device is operated in this manner, however, pull-wire 53 must, of course, be released before the vehicle comes to a stop or while the engine is turning over. If desired, the adjustment may be such that no movement of member 14 is had when pull-wire 53 is pulled.

Figure 9:
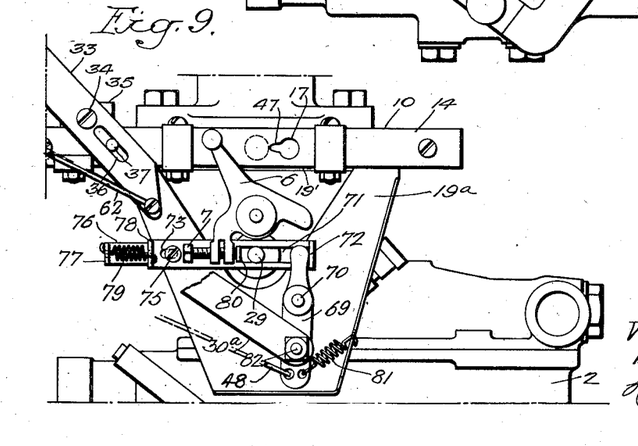
Fig. 9 is a side elevational view, illustrating a modified form of the device.

Considering now the embodiment disclosed in Fig. 9, this form of the device is identical with that above described, except that the mechanism for moving the throttle from idling to closed position is modified. In this instance, bracket 19a carried by block 10 has pivotally attached thereto a lever 69, the lever being pivoted at 70. The upper end of this lever projects into a slot 71 in a slidable stop member 72. Member 72 is provided with a second slot 73 and pins 29 and 75 extend through the respective slots and slidably support the stop member. Slot 73 also serves to limit the travel of member 72. Bracket 19a is provided with an extending arm 76 having a transversely bent end 77. The end 78 of member 72 is also transversely bent and a spring 79 is connected between the bent end portions aforesaid. Member 72 also has a transversely-bent stop portion 80 which is normally engaged by the idling adjustment screw 7 and maintains the throttle in the desired idling position. Spring 79 functions to normally maintain member 72 in its effective position to maintain the throttle in its idling position. A spring 81, connected between the lower end of lever 69 and bracket 19a, serves to normally maintain lever 69 in its inoperative position. An arm 30a, which corresponds to arm 30 of the previously-described embodiment, is connected at one end to lever 69, as at 82, and is otherwise identical with arm 30.

The operation of this form of device is generally similar to the operation of the previously-described device as above set forth. The throttle-actuating mechanism normally controls the movement of valve member 14 as before. Actuation of pull-wire 62 also serves to render valve member 14 inoperative independently of the throttle-actuating mechanism as above described. In the present instance, however, when the pull-wire 53 is actuated, lever 69 is moved about its pivot against the action of spring 81 and urges stop member 72 to inoperative position against the action of spring 79, thus allowing the throttle to completely close. Upon release of the pull-wire 53, lever 69 and stop member 72 are returned to their inoperative positions under the action of springs 81 and 79, respectively.

Coming now to the embodiment of the device disclosed in Figs. 10 to 13, the valve block 10b is, in this instance, formed with a single port 12b on one side of the block and leading into the central chamber. Bracket 19b, mounted similarly to bracket 19, pivotally carries a lever member 83. This member is pivoted at the throttle stop 29 to the bracket and is formed to provide a transversely-extending wedge portion 85 which is normally in the position clearly illustrated in Fig. 10 so that the upper end thereof is engaged by the idling adjustment screw 7 to maintain the throttle in its idling position. The lever member is slotted arcuately at 86 and a pin 87, carried by bracket 19b, extends through and is adapted to ride in the slot. A spring 88 connected between the lower end of the lever member and the bracket normally urges the lever member to the position illustrated and maintains it in a position to limit the closing movement of the throttle to the desired idling position.

The extending end of member 83 has pivotally connected thereto at 89 a slotted arm 90, which in turn is pivotally and slidably connected at 91 to an oscillable valve disk 92. A series of apertures 91a in disk 92 enable adjustable connection of arm 90 thereto. Disk 92 is rotatably secured by screw 93 to a supporting member 94 which is rigidly attached to block 10b. Member 94 and block 10b are formed to provide a seat in which a rounded nipple 94a of plate 94b seats, as clearly illustrated in Figs. 11 and 12. Plate 94b is secured against rotation by screw 93. Thus, a ball and socket connection is made to port 12b and proper engagement of disk 92 with plate 94b is maintained at all times to prevent leakage. A cover plate 95 having a hopper-shaped portion 96 and attachment legs 97 is attached to bracket 19b, the hopper portion leading to the valve port. Disk 92 is provided with a valve opening 98 which is normally out of alignment with port 12b so that the valve is normally closed. Upon rotary movement of disk 92, however, opening 98 moves into registry with port 12 to open the valve and admit air or vapor through hopper 96. The purpose of hopper 96 is to provide means for attaching an air-conducting tube 98a or the like leading from the upper part of the crank case or any other suitable source of air or vapor. If desired, an air or vapor filtering or cleansing device may be inserted in the hopper. By having plate 94b shaped substantially as illustrated, leakage of air from the surrounding atmosphere into the valve port is prevented. It will be apparent from Fig. 10 that when any part of opening 98 registers with port 12b, the opening is closed from the atmosphere by plate 94b on one side and cover plate 95 on the other side.

Figures 10, 10A, 11, 12:
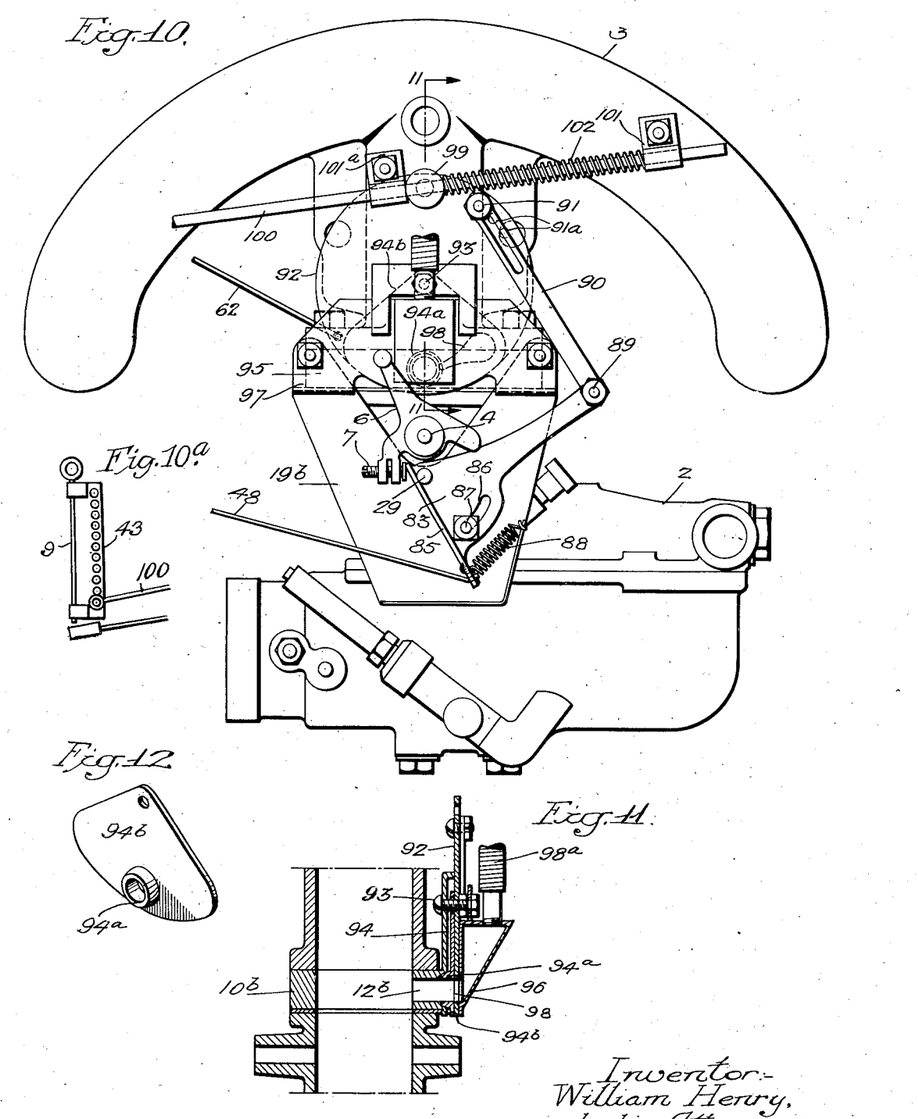
Fig. 10 is a side elevational view of another modification.
Fig. 10a is a detail view of a connection of this device.
Fig. 11 is a sectional view along line 11—11 of Fig. 10.
Fig. 12 is a detail view of an element of this device.

In this instance, the pull-rod 48 is attached to lever member 83, as illustrated, and serves to actuate the lever member to move the throttle to closed position and open the valve through the medium of arm 90. Actuation of the pull-rod will, of course, cause pivotal movement of member 83, causing the wedge portion 85 thereof to become substantially vertically disposed so that its upper end moves away from the idling adjustment screw 7, thereby allowing the throttle to close.

Valve disk 92 carries a cylindrical block 99 through which rod 100 slidably extends. This rod is connected non-slidably to the plate 43 attached to the throttle-actuating arm 9, as shown in Fig. 10a. In this instance the desired lost motion between the throttle-actuating arm 9 and the valve disk is obtained by means of adjustable stops 101 and 101a attached to rod 100 and a coil spring 102 interposed between stop 101 and block 99. The spring and stops normally form a relatively rigid connection between rod 100 and disk 92 so that the motion of the throttle-actuating arm 9 is normally transmitted to the disk, causing opening of the valve proportionately to the throttle opening. Thus, the air admitted is of the proper quantity for varying engine speeds. The slot in arm 90 gives sufficient lost motion between this arm and disk 92 so that arm 90 is not actuated by movement of the disk under control of the throttle-actuating mechanism, or pull-wire 62 which in this case is connected to disk 92 and serves the above-stated purpose.

By virtue of the connection of rod 100 to disk 92 through the medium of spring 102, as above described, manual operation of member 83 to move the throttle to completely closed position and actuate the valve disk 92 is independent of the throttle-actuating mechanism, as is also operation of disk 92 by pull wire 62. Movement of the disk 92 is in such case in opposition to the action of spring 102. While the spring serves to connect rod 100 and disk 92 so that the disk is under control of the throttle-actuating mechanism, it allows the disk to move independently of the throttle-actuating mechanism. During such independent movement of the disk, rod 100 does not move longitudinally and the disk is oscillated against the action of the spring. The connection of arm 90 to disk 92 may be varied, as above mentioned, and this corresponds to the adjustment between arm 30 and valve member 14 of the previously described device. Likewise, stops 101a and 101 may be moved to effect an adjustment similar to the adjustment of the connection of rod 39 to arm 33, above described. The same functions which the first described adjustments permit are also made possible by the adjustments of this form of device.

Figures 8, 13, 14:
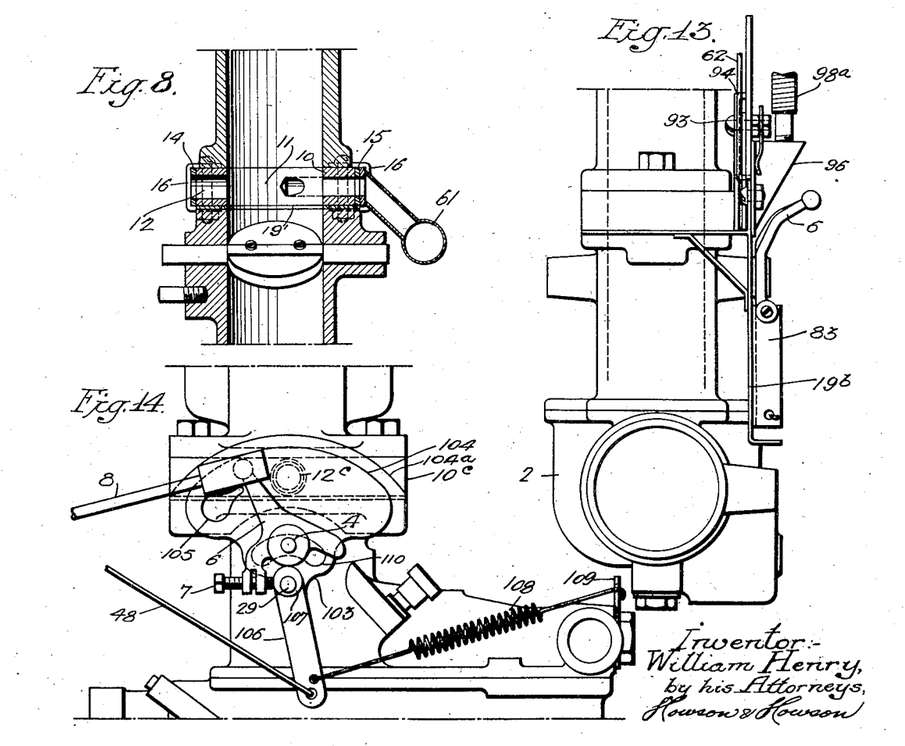
Fig. 8 is a sectional view taken along line 8—8 of Fig. 7.
Fig. 13 is an end elevational view of this form of the device.
Fig. 14 is a side elevational view of another modification.

In Fig. 14, there is disclosed a still further modification of the device in which the valve block 10c is preferably formed similarly to block 10b with a single valve port 12c at one side thereof, and leading into the central chamber. In this instance, a rotatable flat valve member 103 is provided and is pivotally mounted upon the throttle stop 29. The valve member has an upper head portion 104 which is substantially arcuately shaped and provided with a valve opening 105. This opening is, of course, adapted to cooperate with port 12c to uncover the same as in the previously described devices. A flat plate 104a is interposed between portion 104 and block 10c. This plate is generally similar to plate 94b above described and serves the same useful purpose when vapor is taken from the crankcase. A ball and socket connection to port 12c is, therefore, provided in this case also. Valve member 103 also has a lower extending end 106 and a raised eccentric portion 107, the latter portion being engaged by the idling adjustment screw 7. Pull-rod 48 is in this instance connected to the lower extremity of the extending end 106, as illustrated. A spring 108 connected between end 106 and a stationary element, such as an arm 109 carried at an end of the carburetor, serves to normally urge the valve member to the position shown. In this device, the valve is not under control of the throttle-actuating mechanism and is entirely manually operated, there being a single manual operation which causes the valve to open and the throttle to move from its idling position to its completely closed position. The valve member is provided with a slot 110 to accommodate the shaft of arm 6 and limit the movement of the valve member during oscillatory movement thereof. Eccentric portion 107 is so formed that with the device in inoperative position, screw 7 engages a high portion of the eccentric and may be properly adjusted for idling of the engine with the eccentric thus disposed. Upon movement of rod 48, however, to oscillate the valve member, the eccentric portion of that member will rotate and present to screw 7 a lower portion which will allow the throttle to completely close. At the same time, the valve oscillation will cause registry of opening 105 with port 12c to admit air or vapor to the intake manifold. It will be understood, of course, that rod 48 is connected to a flexible pull-wire which passes through the cowl of the vehicle and terminates in a handle within ready access of the operator. A latching device will, of course, be provided to enable the latching of the device in its operative condition, but the operator may simply manually operate the device to varying degrees in order to obtain partial operation as will be apparent.

From the foregoing description, it will be obvious that each of the various embodiments of the invention disclosed herein embodies the most important feature of the invention by means of which the engine throttle is completely closed and air or vapor is admitted to the intake manifold to effect the desired saving in fuel and otherwise enhance the operation of the vehicle as already pointed out. It is important to note also that these various devices are all self-contained and may be readily attached to an existing engine, it being unnecessary to associate the device with a vehicle during manufacture thereof. Since the fuel supply pipe leading from the carburetor to the intake manifold and carrying the throttle is in all cases formed in sections with a coupling just beyond the throttle, the valve block of each of the various devices may be merely inserted between the pipe sections and fastened in place, forming as it were a part of the supply pipe. The various other elements of these devices may also be readily attached to an existing vehicle, as will be quite apparent. The device may, however, be built into the carburetor during manufacture thereof if desired.

Although the invention has been illustrated herein with reference to several different embodiments, various changes and modifications may be made and any such changes as come within the scope of the appended claims are to be considered a part of the invention. The term "air" has been used in the claims in a broad sense to mean air or vapor, and is to be so construed.

I claim:

1. A device adapted for use with an internal combustion engine having a fuel intake manifold and a fuel admission throttle, comprising means for admitting a fluid medium to said manifold between the throttle and the engine, means for normally maintaining said throttle in a predetermined position for idling operation of said engine, means for moving said throttle from said predetermined position to a substantially closed position and vice versa, manually operable means for simultaneously controlling both said fluid medium admission means and said throttle moving means, to permit closing of said throttle and opening of said fluid medium admission means, and manually operable means for actuating said fluid medium admission means.

2. A device adapted for use with an internal combustion engine having a fuel intake manifold and a fuel admission throttle, comprising means for admitting a fluid medium to said manifold between the throttle and the engine, means for normally maintaining said throttle in a predetermined position for idling operation of said engine, means for moving said throttle from said predetermined position to a substantially closed position, and vice versa, manually operable means for simultaneously controlling both said fluid medium admission means and said throttle moving means, to permit closing of said throttle and opening of said fluid medium admission means, and manually operable means for rendering said fluid medium admission means inoperative.

3. A device adapted for use with an internal combustion engine having a fuel intake manifold, a fuel admission throttle, and throttle-actuating means, comprising means for admitting a fluid medium to said manifold between the throttle and the engine, means for moving said throttle from a predetermined position for idling operation of said engine to a substantially closed position, and vice versa, means controlled by said throttle-actuating means for actuating said fluid medium admission means, and manually operable means for simultaneously controlling said fluid medium admission means and said throttle moving means independently of said throttle-actuating means.

4. A device adapted for use with an internal combustion engine having a fuel intake manifold, a fuel admission throttle, and throttle-actuating means, comprising means for admitting a fluid medium to said manifold between the throttle and the engine, means for moving said throttle from a predetermined position for idling operation of said engine to a substantially closed position and vice versa, means controlled by said throttle-actuating means for actuating said fluid medium admission means, manually operable means for actuating said fluid medium admission means independently of said throttle-actuating means, and manually operable means for simultaneously controlling said fluid medium admission means and said throttle moving means independently of said throttle-actuating means.

5. A device adapted for use with an internal combustion engine having a fuel intake manifold, a fuel admission throttle, and throttle-actuating means, comprising means for admitting a fluid medium to said manifold between the throttle and the engine, means for moving said throttle from a predetermined position for idling operation of said engine to a substantially closed position and vice versa, means controlled by said throttle-actuating means for actuating said fluid medium admission means, manually operable means for simultaneously controlling said fluid medium admission means and said throttle moving means independently of said throttle-actuating means, and manually operable means for rendering said fluid medium admission means inoperative.

6. A device adapted for use with an internal combustion engine having a fuel intake manifold and a fuel admission throttle, comprising a plurality of independently operable means for admitting a fluid medium to said manifold between the throttle and the engine, means for moving said throttle from a predetermined position for idling operation of said engine to a substantially closed position, and vice versa, manually operable means for actuating one of said fluid medium admission means, and means for simultaneously controlling all of said fluid medium admission means and said throttle moving means.

7. A device adapted for use with an internal combustion engine having a fuel intake manifold and a fuel admission throttle, comprising a plurality of independently operable means for admitting a fluid medium to said manifold between the throttle and the engine, means for moving said throttle from a predetermined position for idling operation of said engine to a substantially closed position and vice versa, means for simultaneously controlling all of said fluid medium admission means and said throttle moving means, and manually operable means for rendering one of said fluid medium admission means inoperative.

8. A device adapted for use with an internal combustion engine having a fuel intake manifold and a fuel admission throttle, comprising a plurality of independently operable means for admitting a fluid medium to said manifold between the throttle and the engine, means for moving said throttle from a predetermined position for idling operation of said engine to a substantially closed position, and vice versa, means for simultaneously controlling all of said fluid medium admission means and said throttle moving means, and manually operable means for rendering either of said fluid medium admission means inoperative.

9. A device adapted for use with an internal combustion engine having a fuel intake manifold, a fuel admission throttle, and throttle-actuating means, comprising a plurality of independently operable means for admitting a fluid medium to said manifold between the throttle and the engine, means for moving said throttle from a predetermined position for idling operation of said engine to a substantially closed position and vice versa, means controlled by said throttle-actuating means for actuating one of said fluid medium admission means, and means for simultaneously controlling all of said fluid medium admission means and said throttle moving means independently of said throttle-actuating means.

10. A device adapted for use with an internal combustion engine having a fuel intake manifold, a fuel admission throttle, and throttle-actuating means, comprising a plurality of independently operable means for admitting a fluid medium to said manifold between the throttle and the engine, means for moving said throttle from a predetermined position for idling operation of said engine to a substantially closed position and vice versa, means controlled by said throttle-actuating means for actuating one of said fluid medium admission means, manually operable means for actuating said one fluid medium admission means independently of said throttle-actuating means, and means for simultaneously controlling all of said fluid medium admission means and said throttle moving means independently of said throttle-actuating means.

11. A device adapted for use with an internal combustion engine having a fuel intake manifold, a fuel admission throttle, and throttle-actuating means, comprising a plurality of independently operable means for admitting a fluid medium to said manifold between the throttle and the engine, means for moving said throttle from a predetermined position for idling operation of said engine to a substantially closed position and vice versa, means controlled by said throttle-actuating means for actuating one of said fluid medium admission means, means for simultaneously controlling all of said fluid medium admission means and said throttle moving means independently of said throttle-actuating means, and manually operable means for rendering said one fluid medium admission means inoperative.

12. A device adapted for use with an internal combustion engine having a fuel intake manifold, a fuel admission throttle, and throttle-actuating means, comprising means for admitting a fluid medium to said manifold between the throttle and the engine, means for moving said throttle from a predetermined position for idling operation of said engine to a substantially closed position, and vice versa, and manually operable means for simultaneously controlling said fluid medium admission means and said throttle moving means independently of said throttle-actuating means.

WILLIAM HENRY.